No. 817,309. PATENTED APR. 10, 1906
L. W. G. FLYNT.
CLUTCH.
APPLICATION FILED JUNE 7, 1905.

Witnesses:
Jas. E. Hutchinson

Inventor:
Louis W. G. Flynt,
By ... Attorneys.

UNITED STATES PATENT OFFICE.

LOUIS W. G. FLYNT, OF ROCHESTER, NEW YORK, ASSIGNOR TO QUENTIN W. BOOTH AND IRVING E. BOOTH, OF ROCHESTER, NEW YORK.

CLUTCH.

No. 817,309.  Specification of Letters Patent.  Patented April 10, 1906.

Application filed June 7, 1905. Serial No. 264,081.

*To all whom it may concern:*

Be it known that I, LOUIS W. G. FLYNT, a subject of the King of Great Britain, residing at Rochester, in the county of Monroe and State of New York, have invented certain new and useful Improvements in Clutches, of which the following is a specification, reference being had therein to the accompanying drawings.

This invention relates to clutches, and has for its object the provision of a device of this character which will be simple in construction, positive in action, and durable.

Although susceptible of application to various types of machinery, the clutch is particularly adapted to comparatively low-speed mechanisms—such, for instance, as in imitation-stitch-indenting machines.

Broadly, the invention comprehends in combination a rotary driving member, a driven member, said members having recessed portions, a movable coupling device interposed between said members, and an operating device for shifting said coupling device into engagement with alined recesses in the driving and driven members, whereby said members are positively connected, said coupling device being rounded in the direction of rotation of the driving member, so that when the operating device is released or reversely actuated the tendency of the rotary driving member is to throw the coupling device away from engagement with its recess owing to the contact of the wall of said recess with the curved surface of said coupling to promptly effect the uncoupling of the driving and driven members.

The invention further embraces in combination a driving member, a driven member, said members having recessed portions, a movable coupling-ball interposed between said members, and an operating device for shifting said ball into engagement with alined recesses in the driving and driven members, whereby said members are positively connected.

In the accompanying drawings a convenient embodiment of the invention possessing the novel characteristics above noted is illustrated, and upon an inspection of the same, together with the detailed description hereinafter contained, such characteristic features as also others will be apparent.

Figure 1:
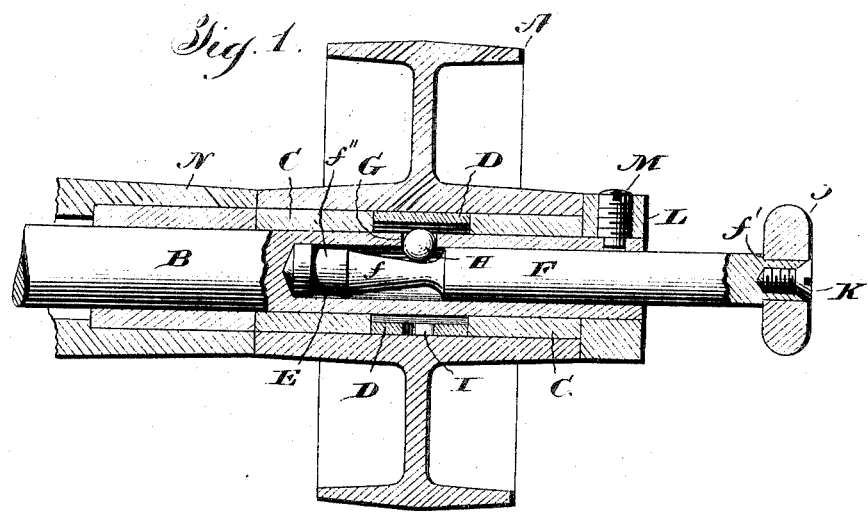
Figure 2:
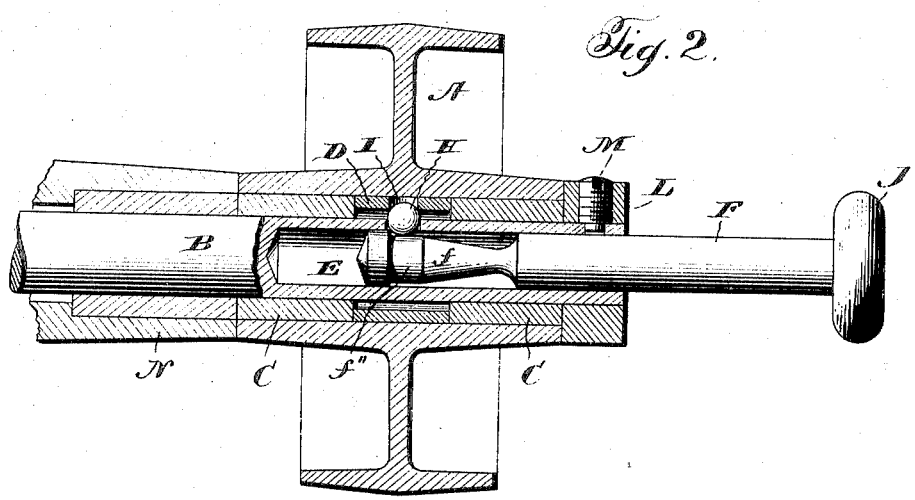

In the drawings, Figure 1 is a longitudinal section of a pulley and shaft formed with my improved clutching instrumentalities, the pulley in this instance being shown as uncoupled from the shaft. Fig. 2 is a similar view showing the parts in coupled relation; and Fig. 3 is a transverse sectional view of Fig. 2, this view being somewhat enlarged for the sake of clearness.

Referring more specifically to the drawings, wherein like reference characters refer to corresponding parts in the several views, A designates a driving-pulley, which is normally loose on the driven shaft B and is provided with two bearing-bushes C, preferably of brass or bronze metal, and a hardened-steel bush D, the latter being interposed between the bushes C. These bushes C fit the shaft B, while the bush D is bored considerably larger. The rear end of the shaft is drilled longitudinally, as at E, to receive a clutch-rod F, and is also drilled laterally, as at G, to receive a steel ball H. Within the same vertical plane with this ball are one or more holes or recesses I, formed in the steel bush D, a series of these recesses being shown in the present instance, Fig. 3, disposed at suitable distances apart around said steel bush. The holes or recesses just defined are somewhat smaller than the diameter of the ball for a special purpose, as will presently appear. The inner end $f$ of the clutch-rod F is substantially conical in shape, and the steel ball H rests on its periphery. This conical end of the clutch-rod is of such dimensions that when the ball rests thereon at its smallest diameter the latter does not come in contact with the bush D, but when the rod is pulled out through the medium of a hand knob or lever J the ball riding up the inclined surface of the conical end thereof will be forced through the hole G in the shaft B and against the inner face of the bush D until it finds one of the holes in said bush, when it is forced partly thereinto and is held between the bush and the shaft, resulting in the effectual and positive gripping of the pulley about the shaft, whereby they must rotate together, the steel bushing D being secured in the pulley.

Figure 3:
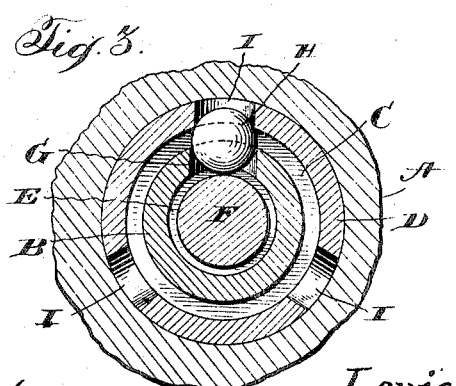

Owing to the relative formation and proportions of the ball H and the apertures I in the steel bushing D, it will be noted, Fig. 3, that the extent of protrusion of the ball into any one of said recesses is to an extent less than half of the diameter of the ball, whereby the ball is absolutely prevented from becoming frictionally clamped in said recess owing to the fact that at all times it presents an inwardly-flaring rounded surface to the wall or walls of the recess, thereby utilizing the constant tendency of the pulley during its rotation to force the ball out of engagement with its recess. By this arrangement a prompt uncoupling of the parts is assured, for as the clutch-rod F is thrown inwardly the advantage of this inherent characteristic tendency of the pulley to force the ball out of coupling relation therewith is supplemented by the force of gravity, which will of course cause the ball to drop onto that portion of smallest diameter of the conical end of said clutch-rod.

The hand knob or lever J is mounted loosely upon the shouldered outer end $f'$ of the clutch-rod F, being held in position thereon by a screw K.

L is a collar secured to the shaft B by a set-screw M, and serves to retain the pulley against outward movement on the shaft. Any suitable abutment N properly a part of the machine prevents movement of the pulley in an opposite direction.

A clutch made in keeping with the description thus far given is one of marked efficiency; but in practice it has been found that even better results are secured when the inner end of the conical portion $f$ of the clutch-rod F merges into a straight peripheral portion $f''$. The value of this additional feature will be obvious from Fig. 2, the function of such straight portion being to slide beneath and support the ball in its coupling position, thereby overcoming any tendency of the clutch-rod to loosen which may be present where the inclined surface of the conical portion supports the ball while in its coupling position.

It will be understood that the invention is susceptible of embodiment in still other forms and structure than that disclosed herein.

Having thus described the invention, what is claimed as new, and desired to be secured by Letters Patent, is—

1. In combination, a driving member having a steel bush provided with a plurality of holes, and a brass bush at each side of said steel bush, a driven member having a hole adapted to register with the holes in the steel bush, a movable coupling-ball operatively associated with said members, and an operating device for shifting said coupling-ball into engagement with the walls of alined openings in the driving and driven members whereby said members are positively connected.

2. In combination, a driving member having a steel bush provided with a hole, a driven member having a hole adapted to register with the hole in the steel bush, a movable coupling-ball operatively associated with said member, and an operating device for shifting said coupling-ball into engagement with the walls of alined openings in the driving and driven members whereby said members are positively connected.

3. In combination, a driving member, a driven member, said members having recessed portions, a movable coupling-ball operatively associated with said members, and an operating device for shifting the said coupling-ball into engagement with alined recessed portions in the driving and driven members, the wall of the recess in the driving member which is engaged by the ball when coupling being abrupt to afford an abutment for the ball.

4. In combination, a driving member, a driven member, said members having recessed portions, a movable coupling-ball operatively associated with said members, and an operating device for shifting the said coupling-ball into engagement with alined recessed portions in the driving and driven members, the recess in the driving member being substantially circular and of a diameter less than that of the ball.

5. The combination of a shaft having a ball-hole therein, a ball fitting loosely in said hole, the hole being so deep that the ball need not extend beyond the periphery of the shaft, a key longitudinally movable in said shaft behind said ball to force the same outward, and a driving member mounted on the shaft, said member being provided with a substantially circular internal opening arranged to register with the ball-hole in the shaft, and said opening being of less diameter than the diameter of the ball.

6. The combination of a shaft having a ball-hole therein, a ball fitting loosely in said hole, the hole being so deep that the ball need not extend beyond the periphery of the shaft, a key longitudinally movable in said shaft behind said ball to force the same outward, and a driving member mounted on the shaft, said bar being provided with an internal opening arranged to register with the ball-hole in the shaft and the surrounding wall of said ball-hole with which the ball engages when coupling being abrupt to afford an abutment for said ball.

7. In combination, a driving member, a driven member, the driving member having a plurality of internal recesses, and the driven member having a recess adapted to be brought into registration with any one of the recesses in the driving member, a movable coupling-ball in the recess of the driven member, and an operating device for shifting said coupling-ball into engagement with alined recessed portions in the driving and driven members whereby said members are positively connected.

In testimony whereof I affix my signature in presence of two witnesses.

LOUIS W. G. FLYNT.

Witnesses:
QUENTIN W. BOOTH,
ROY C. WEBSTER.